United States Patent
Keiji

(10) Patent No.: US 9,037,369 B2
(45) Date of Patent: May 19, 2015

(54) METHOD OF CONTROLLING CLUTCH TRANSFER TORQUE IN HYBRID VEHICLE

(75) Inventor: Kadota Keiji, Chiba (JP)

(73) Assignees: Hyundai Motor Company, Seoul (KR); Hyundai Motor Japan R&D Center Inc., Chiba (JP); Kia Motors Corporation, Seoul (KR)

( * ) Notice: Subject to any disclaimer, the term of this patent is extended or adjusted under 35 U.S.C. 154(b) by 1024 days.

(21) Appl. No.: 12/557,917

(22) Filed: Sep. 11, 2009

(65) Prior Publication Data

US 2010/0108420 A1    May 6, 2010

(30) Foreign Application Priority Data

Oct. 31, 2008    (KR) .................... 10-2008-0107813

(51) Int. Cl.
  *G06F 7/00*    (2006.01)
  *G06F 17/00*    (2006.01)
  *G06F 19/00*    (2011.01)
  *B60K 6/365*    (2007.10)
  *B60K 6/48*    (2007.10)
  *B60K 6/547*    (2007.10)
  *B60W 10/02*    (2006.01)
  *B60W 20/00*    (2006.01)

(52) U.S. Cl.
  CPC . *B60K 6/365* (2013.01); *B60K 6/48* (2013.01); *B60K 6/547* (2013.01); *B60W 10/02* (2013.01); *B60W 20/00* (2013.01); *B60W 2510/0241* (2013.01); *B60W 2510/0275* (2013.01); *B60W 2710/027* (2013.01); *Y02T 10/6221* (2013.01); *Y02T 10/6269* (2013.01)

(58) Field of Classification Search
  USPC ............ 701/67, 68; 475/1, 2, 3, 4, 11; 477/8, 477/13, 43, 50, 62, 77, 78, 128, 166, 169, 477/174, 176, 180; 702/57, 64, 85, 98, 105, 702/114; 73/115.04
  See application file for complete search history.

(56) References Cited

U.S. PATENT DOCUMENTS

| | | | | | |
|---|---|---|---|---|---|
| 4,296,852 | A | * | 10/1981 | Luerken .................... | 192/104 B |
| 4,516,671 | A | * | 5/1985 | Nishikawa et al. .......... | 477/169 |
| 4,560,054 | A | * | 12/1985 | Kayanoki et al. ............ | 192/204 |
| 5,062,050 | A | * | 10/1991 | Petzold et al. .................. | 701/68 |
| 5,292,288 | A | * | 3/1994 | Kashiwabara et al. ......... | 475/63 |
| 5,484,353 | A | * | 1/1996 | Lux et al. ...................... | 477/169 |
| 5,535,863 | A | * | 7/1996 | Vukovich et al. .............. | 192/3.3 |
| 6,334,833 | B1 | * | 1/2002 | Ochi et al. .................... | 477/143 |
| 6,733,299 | B2 | * | 5/2004 | Eguchi et al. ................. | 477/176 |
| 7,228,209 | B2 | * | 6/2007 | Izawa et al. .................... | 701/22 |

(Continued)

FOREIGN PATENT DOCUMENTS

| JP | 2001-113971 A | 4/2001 |
|---|---|---|
| JP | 2003011699 A | 1/2003 |

(Continued)

*Primary Examiner* — Nicholas Kiswanto
(74) *Attorney, Agent, or Firm* — Mintz Levin Cohn Ferris Glovsky and Popeo, P.C.; Peter F. Corless

(57) ABSTRACT

A method of controlling clutch transfer torque in a hybrid vehicle comprises estimating clutch characteristics from a relation between a control current for a clutch hydraulic valve and a clutch transfer torque corresponding to the control current for the clutch hydraulic valve. With the method, a clutch friction coefficient can be precisely estimated, thereby reducing/eliminating a shock that can occur in the event of the clutch going on or off.

4 Claims, 10 Drawing Sheets

(56) References Cited

U.S. PATENT DOCUMENTS

| | | | |
|---|---|---|---|
| 7,373,234 B1 * | 5/2008 | Hwang et al. | 701/60 |
| 8,718,888 B2 * | 5/2014 | Reibold | 701/68 |
| 2008/0302324 A1 * | 12/2008 | Aswani et al. | 123/179.3 |

FOREIGN PATENT DOCUMENTS

| | | |
|---|---|---|
| JP | 2003-205768 A | 7/2003 |
| JP | 2004-204959 A | 7/2004 |
| JP | 2005-138743 A | 6/2005 |
| JP | 2006-029363 A | 2/2006 |
| JP | 2007-139121 A | 6/2007 |
| JP | 2008-256190 A | 10/2008 |
| JP | 05-263903 B2 | 8/2013 |
| KR | 10-2005-0096104 A | 10/2005 |
| KR | 10-2007-0049069 A | 5/2007 |
| KR | 10-2007-0049987 A | 5/2007 |
| WO | 2006-032317 A1 | 3/2006 |

* cited by examiner

METHOD OF CONTROLLING CLUTCH TRANSFER TORQUE IN HYBRID VEHICLE

CROSS-REFERENCE TO RELATED APPLICATION

This application claims under 35 U.S.C. §119(a) the benefit of Korean Patent Application No. 10-2008-0107813 filed Oct. 31, 2008, the entire contents of which are incorporated herein by reference.

BACKGROUND (a) Technical Field

The present disclosure relates to a method of controlling clutch transfer torque in a hybrid vehicle, in which a clutch friction coefficient is precisely estimated, thereby reducing a shock that can occur in the event of the clutch going on or off.

(b) Background Art

A hybrid vehicle is a vehicle that uses two or more distinct power sources to move the vehicle. The hybrid vehicle typically achieve greater fuel economy and lower emission than conventional combustion engine vehicles.

In a parallel hybrid vehicle, as shown in FIG. 1, an engine 10, a motor 20, and an automatic transmission 30 are directly connected on one axis. A clutch 40 is arranged between the engine 10 and the motor 20. Further, in order to operate these components, an integrated starter generator (ISG) 70 is directly connected with a crank pulley of the engine through a belt, and a high-voltage battery 50 is connected with the motor 20 through an inverter 60 so as to be charged or discharged.

As shown in FIG. 2, the clutch 40 is typically a multi-plate clutch, which is operated under constant oil pressure. As shown in FIG. 3, when control current for a clutch hydraulic valve is increased, the oil pressure for operating the clutch is increased, so that the clutch is coupled (or closed).

Methods for controlling a clutch of a hybrid vehicle have been proposed, including a method of learning and correcting the slope of a transfer torque characteristic of a clutch with respect to a stroke of an electric actuator of the clutch, as disclosed in Japanese Patent Application Publication No. 2007-139121, and a method of controlling a clutch on the basis of a clutch control torque characteristic map showing a relation between clutch control oil pressure and clutch transfer torque, and estimating, offsetting and correcting the clutch transfer torque from vehicle acceleration using the map, as disclosed in Japanese Patent Application Publication No. 2006-336854.

However, since the methods do not consider a dead zone and hysteresis, they cannot estimate a friction coefficient "μ" of the clutch precisely. As a result, transmission torque of the clutch cannot be exactly controlled, and thus a shock occurs in the event of the clutch going on or off when the vehicle is converted from its motor-driven mode to engine-driven mode.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention is directed to a method of controlling clutch transfer torque in a hybrid vehicle, in which the clutch transfer torque is estimated by exactly checking the pressing force of a clutch plate and simultaneously estimating the friction coefficient of a clutch with high precision when motor power is transmitted to the engine of a fuel cut state by the clutch of a half connected state, in which electric current or oil pressure as a control variable of the clutch among learning sequences is varied to measure the clutch transfer torque, in which a dead zone factor and a hysteresis factor are measured on the basis of the measured clutch transfer torque so as to not only improve a level of estimating the pressing force of the clutch plate but also exactly estimate (calculate) a value of a clutch friction coefficient from the clutch transfer torque, in which a clutch control friction characteristic nearest to the friction coefficient is selected from a preset control friction characteristic map by comparison with the exactly estimated friction coefficient value, and the clutch is controlled depending on the clutch control friction characteristic, so that a shock phenomenon can be reduced in the event of a clutch going on or off (motor or engine based traveling).

In one aspect, the present invention provides a method of controlling clutch transfer torque in a hybrid vehicle, wherein clutch characteristics are estimated from a relation between a control current for a clutch hydraulic valve and a clutch transfer torque corresponding to the control current for the clutch hydraulic valve, the clutch characteristics including i) a dead zone of the clutch transfer torque with respect to the control current for the clutch hydraulic valve, ii) a hysteresis of the clutch transfer torque with respect to the control current for the clutch hydraulic valve, and iii) a friction coefficient of the clutch.

In an embodiment, the estimation of the clutch characteristics is performed by a process comprising: increasing the control current for the clutch hydraulic valve from an open state of the clutch and recording as the dead zone of the clutch transfer torque the control current for the clutch hydraulic valve at the time when the rpm of the motor, the rpm of the engine, or the clutch transfer torque is subjected to a first change after the control current for the clutch hydraulic valve is increased; further increasing the control current for the clutch hydraulic valve, controlling the control current for the clutch hydraulic valve to be constant when a slip speed of the clutch reaches a predetermined value, recording the constant value of the control current for the clutch hydraulic valve and the clutch transfer torque corresponding to the control current for the clutch hydraulic valve as a controlled variable for measuring a clutch friction coefficient and a transfer torque (Treal) for measuring a clutch friction coefficient, respectively, and recording the constant value of the control current for the clutch hydraulic valve as a controlled variable of a hysteresis start terminal; decreasing the control current for the clutch hydraulic valve and recording as a controlled variable of a hysteresis end terminal the control current for the clutch hydraulic valve at the time when the clutch transfer torque begins to be reduced; obtaining the hysteresis of the clutch transfer torque by dividing the difference between the controlled variable of the hysteresis start terminal and the controlled variable of the hysteresis end terminal; and obtaining a clutch friction coefficient from the controlled variable for measuring a clutch friction coefficient, the transfer torque for measuring a clutch friction coefficient, and the hysteresis of the clutch transfer torque.

In the embodiment, the estimation of the clutch friction coefficient includes: obtaining a pressing force (F1) of the clutch corresponding to the controlled variable for measuring the clutch friction coefficient from a map of a control current versus a pressing force which excludes a dead zone; and calculating the clutch friction coefficient (μ) by the following equation:

$$\mu = \frac{Treal}{2 \cdot r \cdot n \cdot F1}$$

where r represents the effective radius of the clutch, and n represents the number of clutch plates.

The method may further include selecting a friction characteristic nearest to the calculated friction coefficient from a plurality of friction characteristics determined with respect to a friction coefficient and a RPM difference, and using the selected friction characteristic as a friction characteristic map for controlling the clutch torque transfer.

The present invention provides the following effects through the aforementioned embodiments.

When motor power is transmitted to the engine in a state of not receiving fuel by the clutch in a half coupled state, the clutch transfer torque is estimated by exactly checking the pressing force of a clutch plate and simultaneously estimating the friction coefficient "μ" of a clutch with high precision. The clutch transfer torque is measured by varying electric current or oil pressure as a control factor of the clutch among sequences which can be varied for learning. A dead zone factor and a hysteresis factor are measured on the basis of the measured clutch transfer torque, so that it is possible to more exactly improve learning results and their control of the clutch transfer torque characteristics.

When the clutch is controlled using the learning results of characteristics of the clutch transfer torque, the clutch transfer torque can be exactly controlled, so that a shock phenomenon can be reduced in the event of the clutch going on and off (motor or engine based traveling).

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. those using fuel derived from resources other than petroleum). As referred to herein, a hybrid vehicle is a vehicle that has two or more sources of power, for example gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, and present a somewhat simplified representation of various preferred features illustrative of the basic principles of the invention. The specific design features of the present invention as disclosed herein, including, for example, specific dimensions, orientations, locations, and shapes will be determined in part by the specific intended application and use environment.

In the figures, reference numbers refer to the same or equivalent parts of the present invention throughout the several figures of the drawings.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
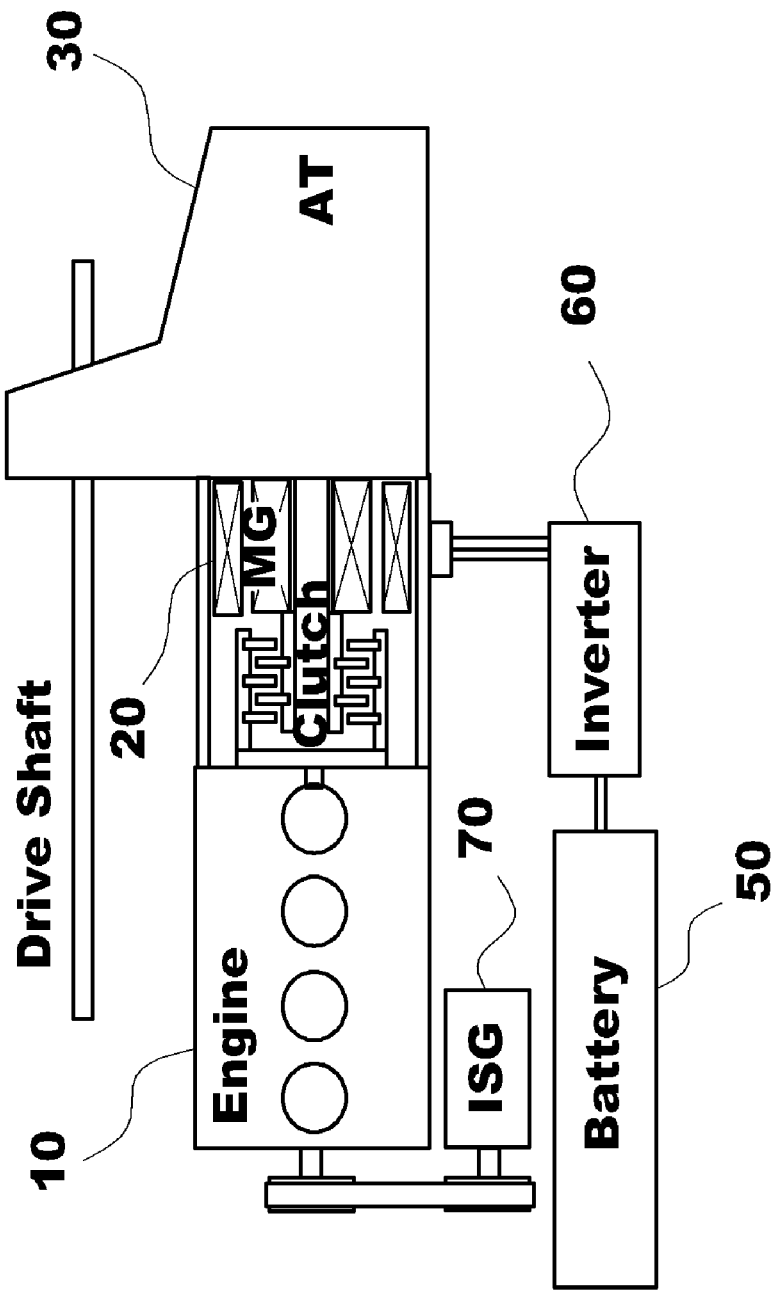
FIG. 1 is a configuration diagram of a hybrid vehicle.
Figure 2:
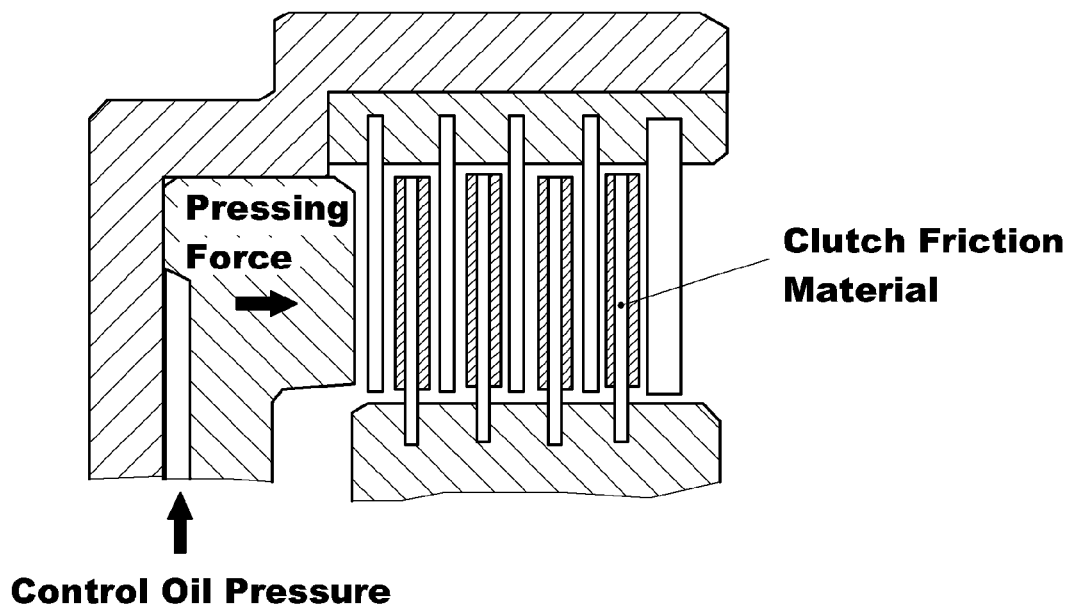
FIG. 2 is a schematic view of a clutch of the hybrid vehicle of FIG. 1.
Figure 3:
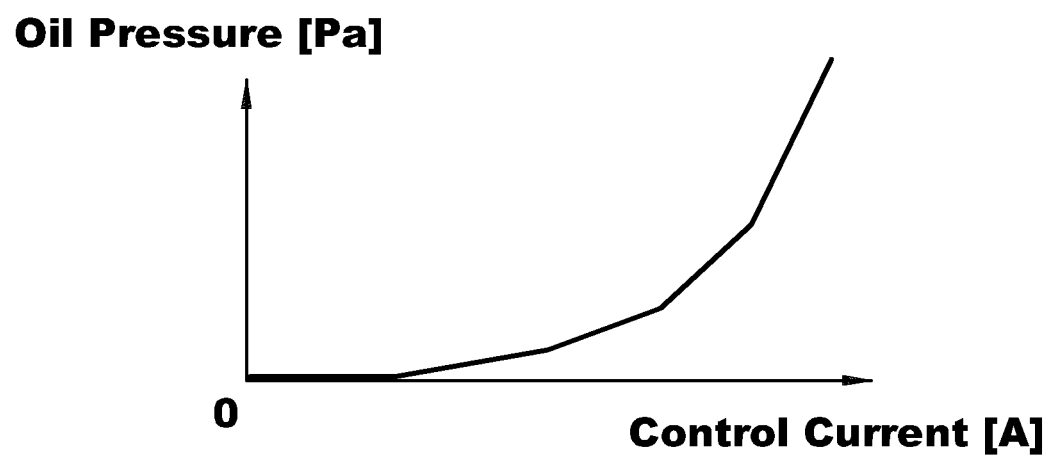
FIG. 3 is a graph showing characteristics of a clutch hydraulic valve of the hybrid vehicle of FIG. 1.
Figure 4:
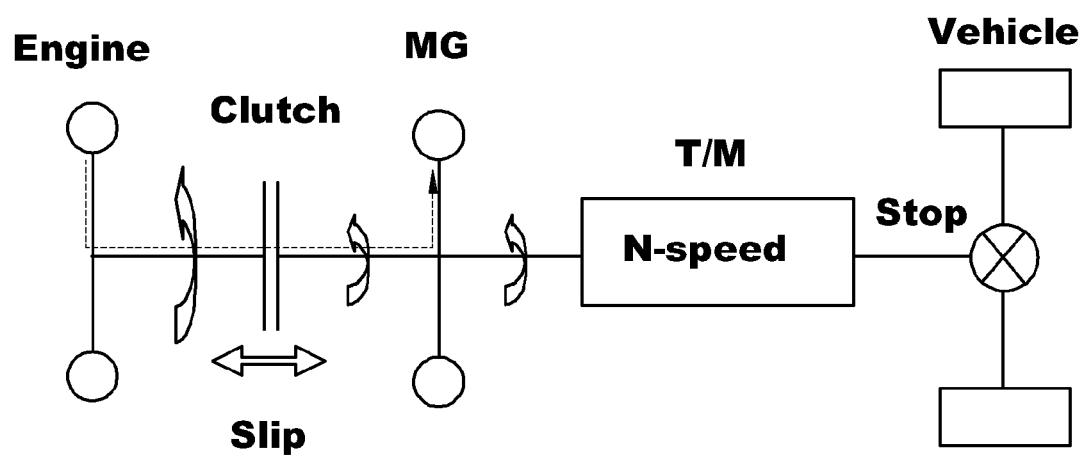
FIG. 4 is a configuration diagram illustrating the learning conditions for a method of controlling clutch transfer torque in a hybrid vehicle in accordance with the present invention.
Figure 5:
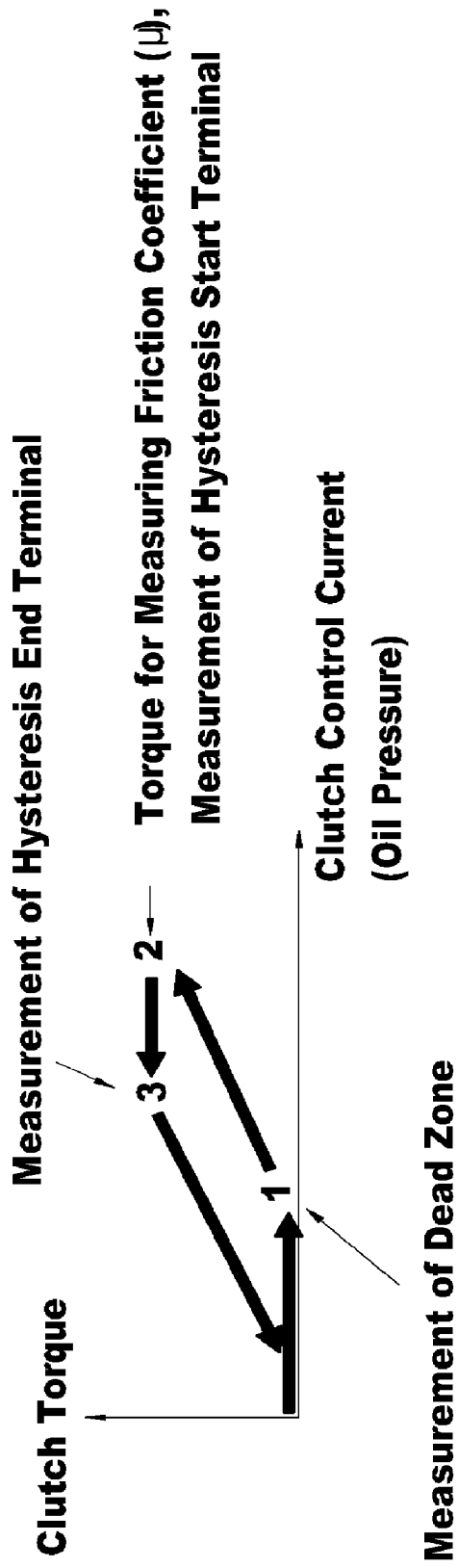
FIG. 5 is a graph illustrating a method of controlling clutch transfer torque in a hybrid vehicle in accordance with a first embodiment of the present invention.

Referring to FIGS. 4 and 5, a method of controlling clutch transfer torque in a hybrid vehicle in accordance with a first embodiment of the present invention.

The hybrid vehicle includes, as shown in FIG. 4, an engine, clutch, a motor/generator, a transmission, and wheels. First, it is checked whether the hybrid vehicle is set in a non-drive range or a drive range when the vehicle is stopped. Then, the transmission is set to a non-drive state (e.g. a neutral (N) position), the clutch is set to a completely open state, and a control current for a clutch hydraulic valve for controlling the clutch is initialized.

Next, the engine is started and controlled to have a constant number of revolutions per minute (rpm). Preferably, the engine is controlled to have such a constant rpm (e.g., about 1000 rpm) that it does not generate excessive noise while being pre-tested.

Subsequently, the motor is controlled to have a constant rpm. The constant rpm of the motor is set to a value equal to or more than an rpm difference between the motor and the engine, which is enough to measure clutch characteristics. For example, if the motor is set to 500 rpm and if the engine is set to 1000 rpm, the rpm difference, 500 rpm can be regarded as a suitable value of the constant rpm.

Thereafter, the control current for the clutch hydraulic valve is gradually increased. As a result, pressing force of the clutch is increased and the clutch is gradually converted from the open state (separated state) to a closed state (coupled state). The clutch control variable, that is, the value of the control current for the clutch hydraulic valve at the time when the rpm of the motor, the rpm of the engine, or the clutch transfer torque starts to be changed is recorded as a dead zone of the clutch transfer torque.

The control current for the clutch hydraulic valve is further increased until a slip speed of the clutch reaches a predetermined value, at which the control current for the clutch hydraulic valve is controlled to be constant. The constant value of the control current for the clutch hydraulic valve (i.e., clutch controlled variable) at this time point and the clutch transfer torque corresponding to the control current are measured (recorded) as a controlled variable for measuring a clutch friction coefficient ("A1") and a transfer torque for measuring a clutch friction coefficient ("Treal"), respectively. Further, the constant value of the control current for the clutch hydraulic valve (i.e., clutch controlled variable) at this time point is recorded as a controlled variable of a hysteresis start point (terminal).

Meanwhile, the predetermined value of the slip speed of the clutch is obtained in a pre-test and is set so as to readily detect the change of the clutch characteristics.

Next, the control current for the clutch hydraulic valve (i.e. clutch controlled variable is gradually decreased until the clutch transfer torque begins to be reduced. The control current for the clutch hydraulic valve at this time point is recorded as a controlled variable of a hysteresis end point (terminal).

Using these controlled variable of the hysteresis start terminal and controlled variable of the hysteresis end terminal, a hysteresis of the clutch transfer torque is calculated by Equation 1 below.

Hysteresis=(Controlled Variable of Hysteresis Start Terminal−Controlled Variable of Hysteresis End Terminal)/2      Equation 1

Then, a clutch friction coefficient is obtained from the controlled variable ("A1") for measuring a clutch friction coefficient, the transfer torque ("Treal") for measuring a clutch friction coefficient, and the hysteresis.

More specifically, the clutch friction coefficient is obtained using an empirically preset map showing the relation between a clutch hydraulic valve control current "A" and an oil pressure "P0" for operating the clutch (A-P0 map), Equation 2 and Equation 3, as described below. The A-P0 map is made by excluding a dead zone of the clutch transfer torque such that it does not include any point where an oil pressure is not generated.

A map of a clutch hydraulic valve control current "A" versus a pressing force of the clutch "F0" excluding the dead zone (A-F0 map) is obtained by converting P0 to F0 by Equation 2.

F0=P0×Piston Effective Area for Clutch      Equation 2

Figure 10:
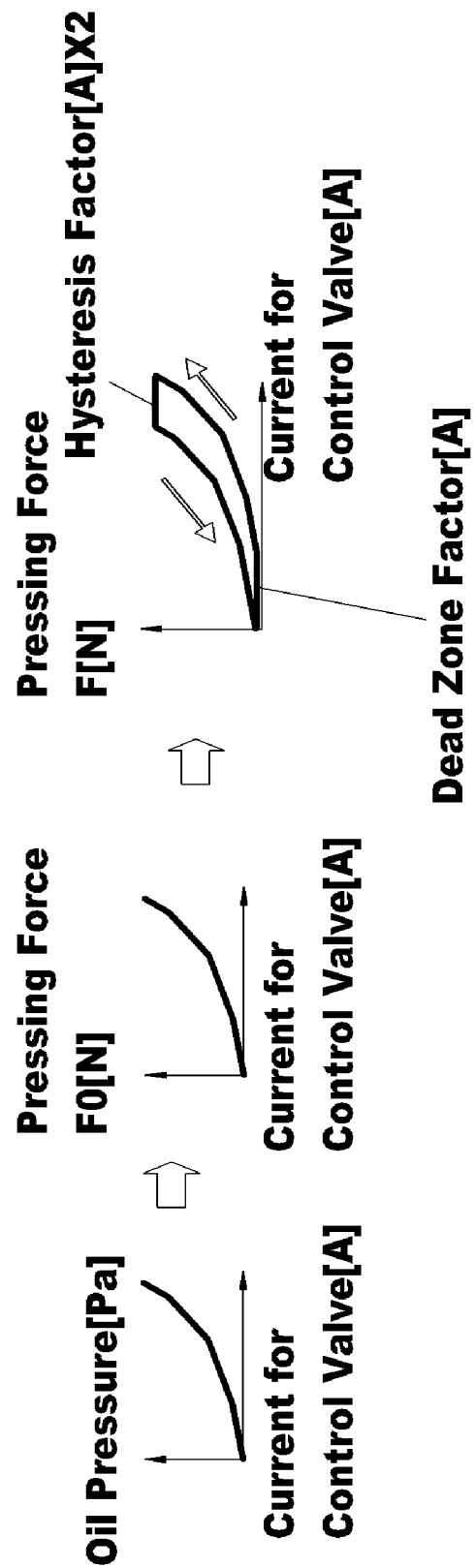
FIG. 10 is a control diagram illustrating an example process of controlling clutch transfer torque in accordance with the present invention, in which a selected control friction characteristic map is used.

As shown in FIG. 10, the A-F0 map is calibrated by reflecting the dead zone and hysteresis.

From the thus-obtained A-F0 map, the pressing force "F1" corresponding to the above-described controlled variable for measuring a clutch friction coefficient is identified. A friction coefficient "μ" of the clutch is calculated from the pressing force "F1" and the transfer torque "Treal" for measuring the clutch friction coefficient by Equation 3 below.

$$\mu = \frac{Treal}{2 \cdot r \cdot n \cdot F1}$$      Equation 3 where r represents the clutch effective radius, and n represents the number of clutches.

Figure 8:
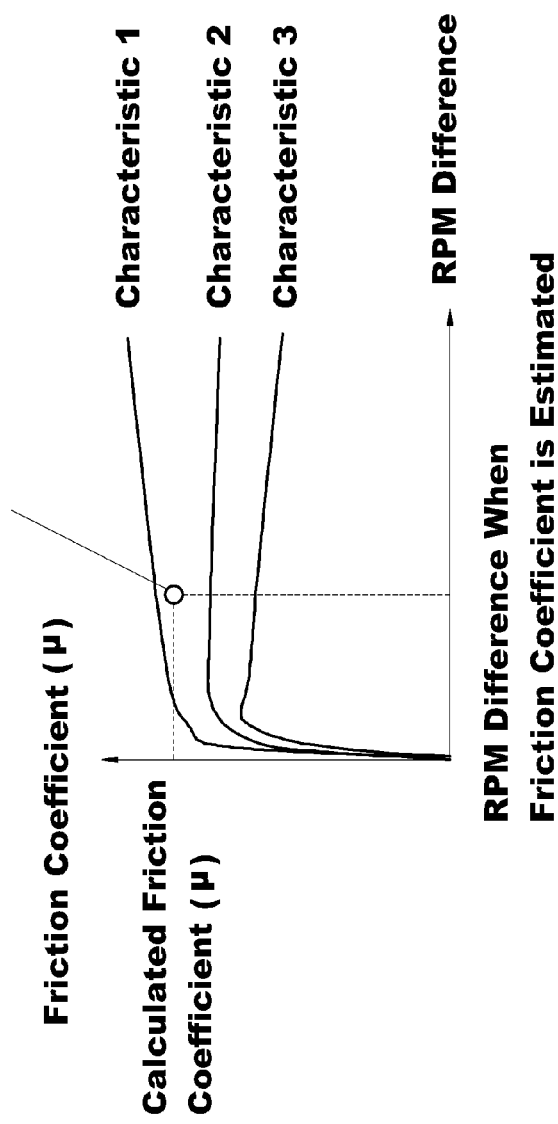
FIG. 8 is a graph illustrating an example process of controlling clutch transfer torque in accordance with the present invention, in which a friction characteristic nearest to a friction coefficient is selected from a plurality of friction characteristics determined in a pre-test, and the selected friction characteristic is used as a control friction characteristic map.

Next, from a preset map in which two or more clutch friction characteristics are shown with respect to a friction coefficient and a RPM difference between the motor and the engine when the controlled variable for measuring a clutch friction coefficient ("A1") and the transfer torque for measuring a clutch friction coefficient ("Treal") are measured, a friction characteristic nearest to the friction coefficient "μ" calculated as described above is selected (see FIG. 8).

Figure 9:
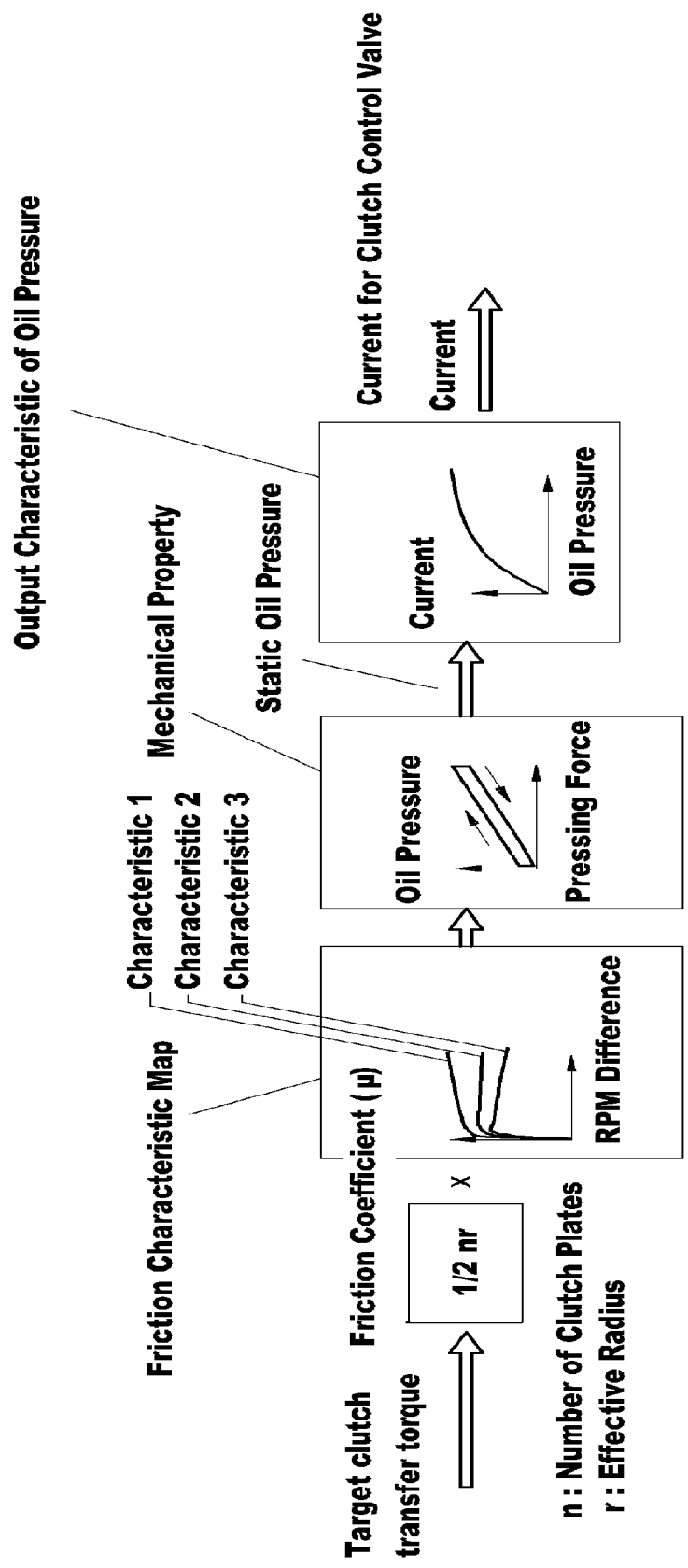
FIG. 9 is a control diagram showing an example process of controlling clutch transfer torque in accordance with the present invention, in which a control friction characteristic map is selected by learning results.

The selected friction characteristic is used as a control friction characteristic map. As an example, the selected control friction characteristic map can be used in the process of controlling the clutch transfer torque, as shown in FIG. 9.

Figure 6:
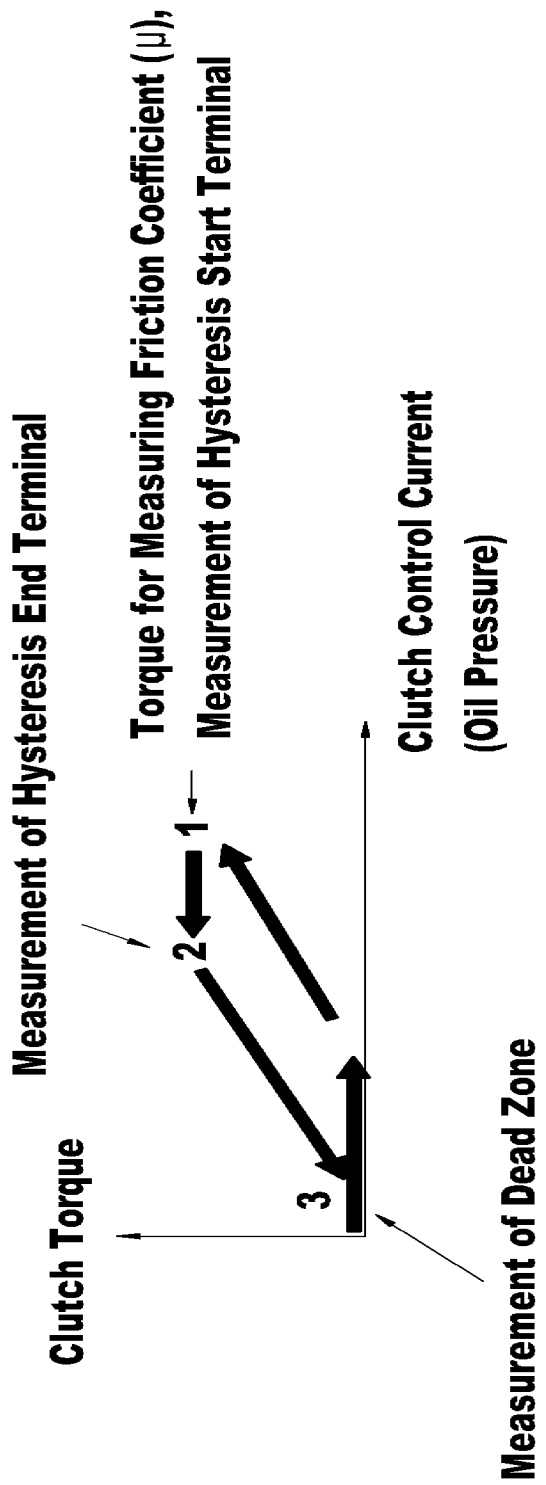
FIG. 6 is a graph illustrating a method of controlling clutch transfer torque in a hybrid vehicle in accordance with a second embodiment of the present invention.

Referring to FIGS. 4 and 6, a method of controlling clutch transfer torque in a hybrid vehicle in accordance with a second embodiment of the present invention.

As in the first embodiment, first, it is checked whether the hybrid vehicle is set in a non-drive range or a drive range when the vehicle is stopped. Then, the transmission is set to a non-drive state (e.g. a neutral (N) position), the clutch is set to a completely open state, and a control current for a clutch hydraulic valve for controlling the clutch is initialized.

Next, the engine is started and controlled to have a constant number of revolutions per minute (rpm). Preferably, the engine is controlled to have such a constant rpm (e.g., about 1000 rpm) that it does not generate excessive noise while being pre-tested.

Subsequently, the motor is controlled to have a constant rpm. The constant rpm of the motor is set to a value equal to or more than an rpm difference between the motor and the engine, which is enough to measure clutch characteristics. For example, if the motor is set to 500 rpm and if the engine is set to 1000 rpm, the rpm difference, 500 rpm can be regarded as a suitable value of the constant rpm.

Next, the control current for the clutch hydraulic valve is gradually increased until a slip speed of the clutch reaches a predetermined value, at which the control current for the clutch hydraulic valve is controlled to be constant. The constant value of the control current for the clutch hydraulic valve (i.e., clutch controlled variable) at this time point and the clutch transfer torque corresponding to the control current are measured as a controlled variable for measuring a clutch friction coefficient ("A1") and a transfer torque for measuring a clutch friction coefficient ("Treal"), respectively. Further, the constant value of the control current for the clutch hydraulic valve (i.e., clutch controlled variable) at this time point is recorded as a controlled variable of a hysteresis start terminal.

Meanwhile, the predetermined value of the slip speed of the clutch is obtained in a pre-test and is set so as to readily detect the change of the clutch characteristics.

Next, the control current for the clutch hydraulic valve (i.e. clutch controlled variable is gradually decreased until the clutch transfer torque begins to be reduced. The control current for the clutch hydraulic valve at this time point is recorded as a controlled variable of a hysteresis end terminal.

Using these controlled variable of the hysteresis start terminal and controlled variable of the hysteresis end terminal, a hysteresis of the clutch transfer torque is calculated by Equation 1 above.

Next, the control current for the clutch hydraulic valve at the time when the clutch transfer torque becomes zero is recorded as a descent-sided dead zone of the clutch transfer torque. Thus, a dead zone is defined as the sum of the calculated descent-sided dead zone and the calculated hysteresis.

Then, a clutch friction coefficient is obtained from the controlled variable ("A1") for measuring a clutch friction coefficient, the transfer torque ("Treal") for measuring a clutch friction coefficient, and the calculated hysteresis.

More specifically, the clutch friction coefficient is obtained using an empirically preset map showing the relation between a clutch hydraulic valve control current "A" and an oil pressure "P0" for operating the clutch (A-P0 map), Equation 2 and Equation 3, as described below. The A-P0 map is made by excluding a dead zone of the clutch transfer torque such that it does not include any point where an oil pressure is not generated.

A map of a clutch hydraulic valve control current "A" versus a pressing force of the clutch "F0" excluding the dead zone (A-F0 map) is obtained by converting P0 to F0 by Equation 2 above.

As shown in FIG. 10, the A-F0 map is calibrated by reflecting the dead zone and hysteresis.

From the thus-obtained A-F0 map, the pressing force "F1" corresponding to the above-described controlled variable for measuring a clutch friction coefficient is identified. A friction coefficient "μ" of the clutch is calculated from the pressing force "F1" and the transfer torque "Treal" for measuring the clutch friction coefficient by Equation 3 above.

Next, from a preset map in which two or more clutch friction characteristics are shown with respect to a friction coefficient and a RPM difference, a friction characteristic nearest to the friction coefficient "μ" calculated as described above is selected (see FIG. 8).

The selected friction characteristic is used as a control friction characteristic map. As an example, the selected control friction characteristic map can be used in the process of controlling the clutch transfer torque, as shown in FIG. 9.

Figure 7:
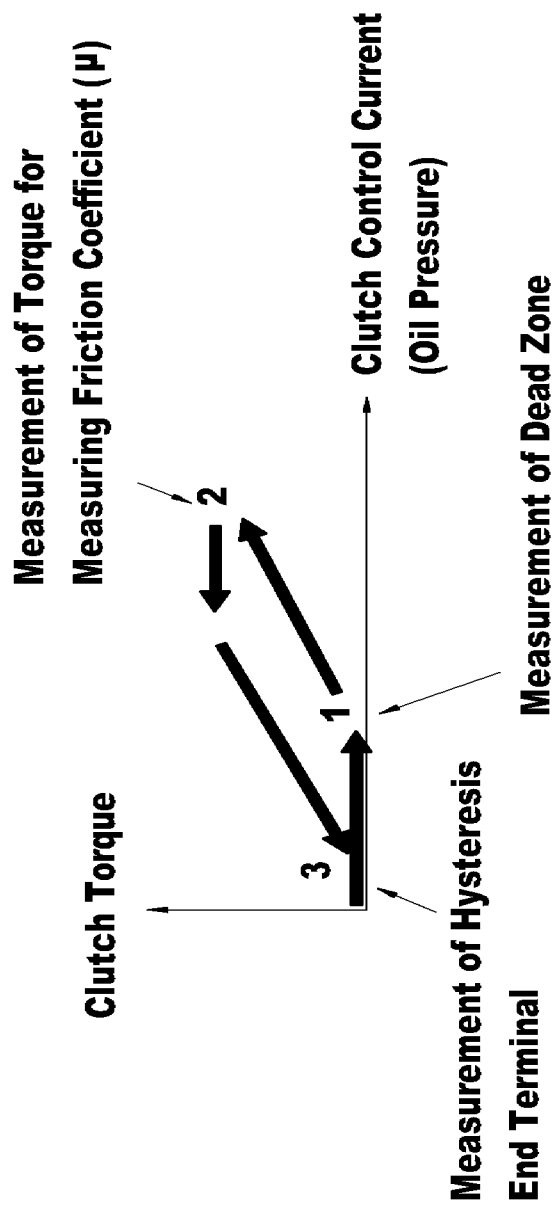
FIG. 7 is a graph illustrating a method of controlling clutch transfer torque in a hybrid vehicle in accordance with a third embodiment of the present invention.

Referring to FIGS. 4 and 7, a method of controlling clutch transfer torque in a hybrid vehicle in accordance with a third embodiment of the present invention.

As in the first embodiment, first, it is checked whether the hybrid vehicle is set in a non-drive range or a drive range when the vehicle is stopped. Then, the transmission is set to a non-drive state (e.g. a neutral (N) position), the clutch is set to a completely open state, and a control current for a clutch hydraulic valve for controlling the clutch is initialized.

Next, the engine is started and controlled to have a constant number of revolutions per minute (rpm). Preferably, the engine is controlled to have such a constant rpm (e.g., about 1000 rpm) that it does not generate excessive noise while being pre-tested.

Subsequently, the motor is controlled to have a constant rpm. The constant rpm of the motor is set to a value equal to or more than an rpm difference between the motor and the engine, which is enough to measure clutch characteristics. For example, if the motor is set to 500 rpm and if the engine is set to 1000 rpm, the rpm difference, 500 rpm can be regarded as a suitable value of the constant rpm.

Thereafter, the control current for the clutch hydraulic valve is gradually increased. As a result, pressing force of the clutch is increased and the clutch is gradually converted from the open state (separated state) to a closed state (coupled state). The clutch control variable, that is, the value of the control current for the clutch hydraulic valve at the time when the rpm of the motor, the rpm of the engine, or the clutch transfer torque starts to be changed is recorded as a dead zone of the clutch transfer torque.

The control current for the clutch hydraulic valve is further increased until a slip speed of the clutch reaches a predetermined value, at which the control current for the clutch hydraulic valve is controlled to be constant. The constant value of the control current for the clutch hydraulic valve (i.e., clutch controlled variable) at this time point and the clutch transfer torque corresponding to the control current are measured as a controlled variable for measuring a clutch friction coefficient ("A1") and a transfer torque for measuring a clutch friction coefficient ("Treal"), respectively. Further, the constant value of the control current for the clutch hydraulic valve (i.e., clutch controlled variable) at this time point is recorded as a controlled variable of a hysteresis start terminal (point).

Meanwhile, the predetermined value of the slip speed of the clutch is obtained in a pre-test and is set so as to readily detect the change of the clutch characteristics.

Next, the control current for the clutch hydraulic valve at the time when the clutch transfer torque becomes zero is recorded as a controlled variable of a hysteresis end terminal.

Using these dead zone and controlled variable of the hysteresis end terminal, a hysteresis of the clutch transfer torque is calculated by Equation 4 below.

$$\text{Hysteresis}=(\text{Dead Zone}-\text{Controlled Variable of Hysteresis End Terminal})/2 \quad \text{Equation 4}$$

Then, a clutch friction coefficient is obtained from the controlled variable ("A1") for measuring a clutch friction coefficient, the transfer torque ("Treal") for measuring a clutch friction coefficient, and the calculated hysteresis.

More specifically, the clutch friction coefficient is obtained using an empirically preset map showing the relation between a clutch hydraulic valve control current "A" and an oil pressure "P0" for operating the clutch (A-P0 map), Equation 2 and Equation 3, as described below. The A-P0 map is made by excluding a dead zone of the clutch transfer torque such that it does not include any point where an oil pressure is not generated.

A map of a clutch hydraulic valve control current "A" versus a pressing force of the clutch "F0" excluding the dead zone (A-F0 map) is obtained by converting P0 to F0 by Equation 2 above.

As shown in FIG. 10, the A-F0 map is calibrated by reflecting the dead zone and hysteresis.

From the thus-obtained A-F0 map, the pressing force "F1" corresponding to the above-described controlled variable for measuring a clutch friction coefficient is identified. A friction coefficient "μ" of the clutch is calculated from the pressing force "F1" and the transfer torque "Treal" for measuring the clutch friction coefficient by Equation 3 above.

Next, from a preset map in which two or more clutch friction characteristics are shown with respect to a friction coefficient and a RPM difference, a friction characteristic nearest to the friction coefficient "μ" calculated as described above is selected (see FIG. 8).

The selected friction characteristic is used as a control friction characteristic map. As an example, the selected control friction characteristic map can be used in the process of controlling the clutch transfer torque, as shown in FIG. 9.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of controlling clutch transfer torque in a hybrid vehicle, comprising:
estimating clutch characteristics from a relation between a control current for a clutch hydraulic valve and a clutch transfer torque corresponding to the control current for the clutch hydraulic valve, the clutch characteristics including a dead zone of the clutch transfer torque with respect to the control current for the clutch hydraulic valve, and a hysteresis of the clutch transfer torque with respect to the control current for the clutch hydraulic valve; and
calculating a clutch friction coefficient using the clutch transfer torque and the hysteresis of the clutch transfer torque,
wherein the clutch transfer torque is measured by varying the control current for the clutch hydraulic valve, and the dead zone and the hysteresis are measured based on the measured clutch transfer torque, such that the dead zone is measured as the control current for the clutch hydraulic valve at a time when an rpm of a motor, an rpm of an engine, or the clutch transfer torque undergoes a first change, and hysteresis start and end terminals are measured by further adjusting the control current for the clutch hydraulic valve, and
the step of estimating clutch characteristics further includes:
increasing the control current for the clutch hydraulic valve from an open state of the clutch and recording as the dead zone of the clutch transfer torque the control current for the clutch hydraulic valve at the time when the rpm of the motor, the rpm of the engine, or the clutch transfer torque is subjected to the first change after the control current for the clutch hydraulic valve is increased;
further increasing the control current for the clutch hydraulic valve, controlling the control current for the clutch hydraulic valve to be constant when a slip speed of the clutch reaches a predetermined value, recording the constant value of the control current for the clutch hydraulic valve and the clutch transfer torque corresponding to the control current for the clutch hydraulic valve as a controlled variable for measuring the clutch friction coefficient and a transfer torque (Treal) for measuring the clutch friction coefficient, respectively, and recording the constant value of the control current for the clutch hydraulic valve as a controlled variable of the hysteresis start terminal;
decreasing the control current for the clutch hydraulic valve and recording as a controlled variable of the hysteresis end terminal the control current for the clutch hydraulic valve at the time when the clutch transfer torque begins to be reduced;
obtaining the hysteresis of the clutch transfer torque by dividing the difference between the controlled variable of the hysteresis start terminal and the controlled variable of the hysteresis end terminal; and
obtaining a clutch friction coefficient from the controlled variable for measuring the clutch friction coefficient, the transfer torque for measuring the clutch friction coefficient, and the hysteresis of the clutch transfer torque.

2. The method of claim 1, wherein the estimation of the clutch friction coefficient includes:
obtaining a pressing force (F1) of the clutch corresponding to the controlled variable for measuring the clutch friction coefficient from a map of a control current versus a pressing force which excludes a dead zone; and
calculating the clutch friction coefficient ($\mu$) by the following equation:

$$\mu = \frac{Treal}{2 \cdot r \cdot n \cdot F1}$$

where r represents the effective radius of the clutch, and n represents the number of clutch plates.

3. The method of claim 2, further including selecting a friction characteristic nearest to the calculated friction coefficient from a plurality of friction characteristics determined with respect to a friction coefficient and a RPM difference, and using the selected friction characteristic as a friction characteristic map for controlling the clutch torque transfer.

4. A method of controlling clutch transfer torque in a hybrid vehicle, wherein clutch characteristics are estimated from a relation between a control current for a clutch hydraulic valve and a clutch transfer torque corresponding to the control current for the clutch hydraulic valve, the clutch characteristics including a dead zone of the clutch transfer torque with respect to the control current for the clutch hydraulic valve and a hysteresis of the clutch transfer torque with respect to the control current for the clutch hydraulic valve, and a clutch friction coefficient is calculated using the clutch transfer torque and the hysteresis of the clutch transfer torque,
wherein the estimation of the clutch characteristics is performed by a process comprising:
increasing the control current for the clutch hydraulic valve from an open state of the clutch and recording as the dead zone of the clutch transfer torque the control current for the clutch hydraulic valve at the time when an rpm of a motor, an rpm of an engine, or the clutch transfer torque is subjected to a first change after the control current for the clutch hydraulic valve is increased;
further increasing the control current for the clutch hydraulic valve, controlling the control current for the clutch hydraulic valve to be constant when a slip speed of the clutch reaches a predetermined value, recording the constant value of the control current for the clutch hydraulic valve and the clutch transfer torque corresponding to the control current for the clutch hydraulic valve as a controlled variable for measuring the clutch friction coefficient and a transfer torque (Treal) for measuring the clutch friction coefficient, respectively, and recording the constant value of the control current for the clutch hydraulic valve as a controlled variable of a hysteresis start terminal;
decreasing the control current for the clutch hydraulic valve and recording as a controlled variable of a hysteresis end terminal the control current for the clutch hydraulic valve at the time when the clutch transfer torque begins to be reduced;
obtaining the hysteresis of the clutch transfer torque by dividing the difference between the controlled variable of the hysteresis start terminal and the controlled variable of the hysteresis end terminal; and
obtaining the clutch friction coefficient from the controlled variable for measuring the clutch friction coefficient, the transfer torque for measuring the clutch friction coefficient, and the hysteresis of the clutch transfer torque.

* * * * *